Aug. 8, 1950          L. J. PETERS          2,518,369
SETWORK
Filed Nov. 12, 1946          2 Sheets-Sheet 1
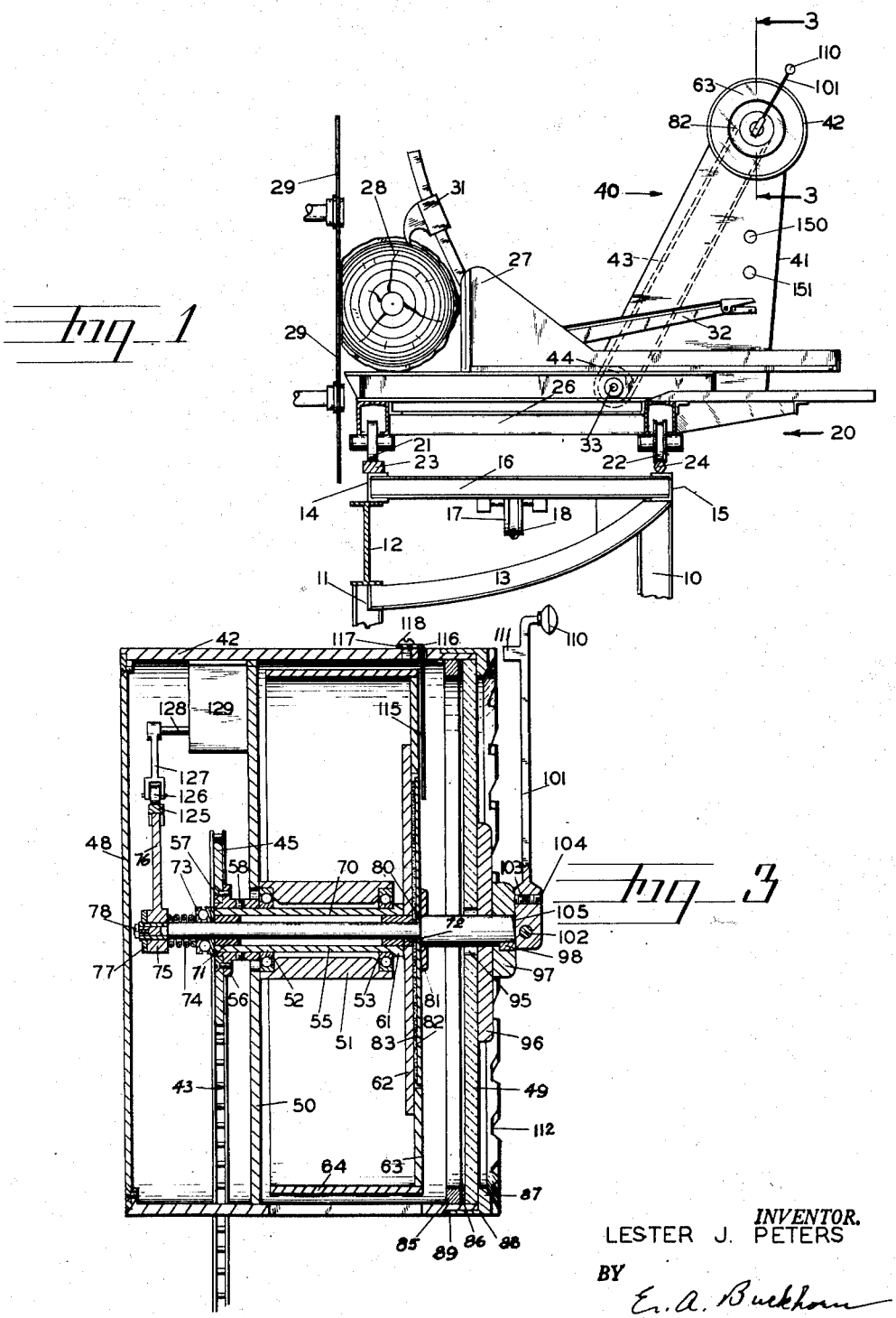
*INVENTOR.*
LESTER J. PETERS
BY
E. A. Buckhorn
ATTORNEY Aug. 8, 1950 L. J. PETERS 2,518,369
SETWORK
Filed Nov. 12, 1946 2 Sheets-Sheet 2
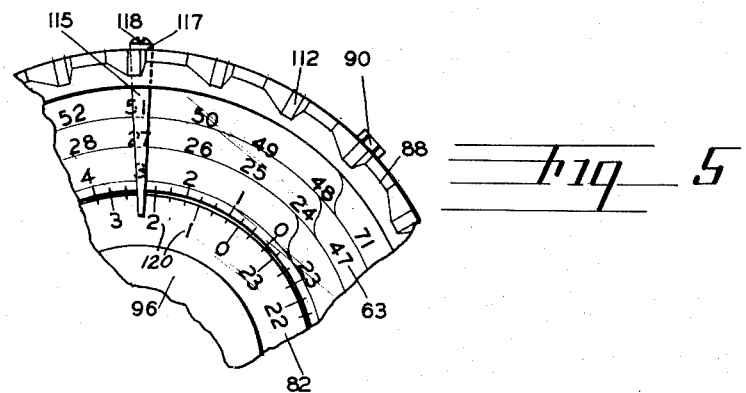
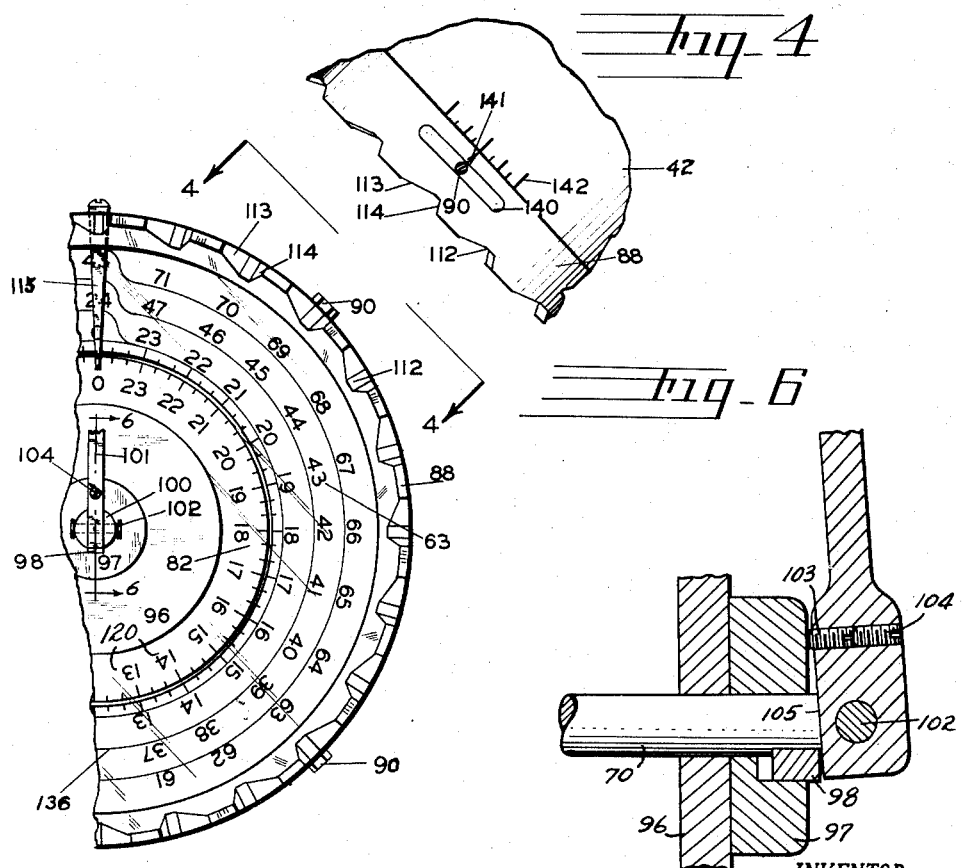
INVENTOR.
LESTER J. PETERS
BY
E. A. Buckham
ATTORNEY Patented Aug. 8, 1950

2,518,369

UNITED STATES PATENT OFFICE 2,518,369

SETWORK

Lester J. Peters, Portland, Oreg.; Dora H. Peters executrix of said Lester J. Peters, deceased Application November 12, 1946, Serial No. 709,291

7 Claims. (Cl. 143—120)

The present invention relates to setworks for indicating and predetermining the relative angular movement of an operating shaft. While the invention is not necessarily to be limited to such specific application, it is particularly adaptable for use in connection with sawmill carriage control.

In certain types of machines a support or holder is provided for a work piece upon which an operation is to be performed by a working tool arranged in a cooperative relation with respect thereto. Upon the completion of one cycle of operation a readjustment is effected between the support or holder for the work piece and the working tool to recondition the setup for a succeeding operating cycle. The adjustment may be effected either by moving the work piece toward the tool or by moving the tool toward the work piece, whichever may be most convenient. Under certain conditions, such as when the part to be adjusted is relatively massive, a power drive is provided which introduces a problem of control in order to insure accuracy of adjustment. The power drive will usually consist essentially of motor means connected to an operating shaft either through a fast coupling or a clutch. The problem of control, therefore, entails the deenergization or declutching of the motor means and the arresting of the motion of the operating shaft in a predetermined angular position.

It is a general object of the invention, therefore, to provide a new and improved setworks for indicating and predetermining the relative angular position of a driven operating shaft.

It is a further object of the invention to provide a new and improved setworks for facilitating accurate control of adjustment effected through a power drive connection between a work piece holder and a tool.

Considering a specific application, for example, the sawing of lumber in which the work piece, in this instance, is a log and which is supported upon a carriage arranged cooperatively adjacent the tool, in this case, a saw. The carriage is so constructed and arranged that after each successive sawing operation the log is shifted toward the saw by a distance corresponding to the thickness desired for the next cut. Because of the great size and weight of the log and carriage mechanism, a power drive usually is provided for effecting the shifting movements, while the movements are controlled through means including a setworks. Since commercial lumber thicknesses are standardized, it is desirable that the increments of advancing movements of the log or cant toward the saw be accurately controlled in order to effect a maximum footage from the log. The setworks now in common use throughout the lumber industry leave much to be desired in this respect. Due to inherent inaccuracies in the conventional setworks, the variation between the set and the cut frequently runs as high as three-sixteenths to one-quarter of an inch. In order to insure that the boards will be of a thickness sufficient to dress to standard dimension, it is a usual practice to run the set high, that is, to intentionally cut the boards considerably thicker than necessary in order to compensate for the maximum of the range of inaccuracy of the setworks. In cutting four-quarter stock, for example, it will be obvious that this practice results in a substantial loss in footage as compared with what might be obtained if the boards are cut more accurately to the required thickness.

It is another object of the invention, therefore, to provide a new and improved setworks for sawmill carriages of the type having a power drive for effecting adjusting movements of a log supported thereon.

A more specific object of the invention is to provide a new and improved setworks for sawmill carriages whereby the increments of forward movement of the log on the carriage may accurately be controlled in accordance with a predetermined setting of the mechanism.

Another object of the invention is to provide a new and improved setworks for sawmill carriages which is so constructed and arranged whereby the operator may effect adjustment of the carriage for any predetermined thickness of cutting with a minimum of effort and time.

A further object of the invention is to provide a new and improved setworks mechanism which is of a simple compact design and which may readily be installed as a unit in a sawmill carriage of conventional types.

A further object of the invention is to provide an improvement upon the structure disclosed in my preceding patent, No. 2,342,967, dated February 29, 1944, entitled Setworks.

Further objects and advantages of the invention will appear from the following description, taken in connection with the accompanying drawings, wherein like numerals refer to like parts throughout, while the features of novelty characterizing the invention will be set forth with greater particularity in the appended claims.

In the drawings:

Fig. 1 is an end view of a portion of a sawmill illustrating a setworks of the present invention installed thereon;

Fig. 2 is a view on an enlarged scale of a portion of the control tower included in the setworks of the present invention;

Fig. 3 is a view taken substantially along line 3—3 of Fig. 1 looking in the direction of the arrows;

Fig. 4 is a partial view of a portion of the control tower taken substantially along line 4—4 of Fig. 3;

Fig. 5 is a view of portions of the control and indicator dials in a different position of use than that illustrated in Fig. 2; and Fig. 6 is a section, on an enlarged scale, taken substantially along line 6—6 of Fig. 2 and illustrating the operation of the clutch lever.

Referring to Fig. 1 there is disclosed a portion of the framework of a sawmill including posts 10 and 11, the longitudinal frame 12 and struts 13 upon which are mounted a carriageway including longitudinal beams 14 and 15 and cross members 16. Mounted within the frame are carriage-propelling means symbolized by pulley 17 and cable 18, the cable being attached (not shown) to a carriage generally indicated by the numeral 20 which is adapted to be propelled longitudinally of the frame. The carriage comprises wheels 21 and 22 which engage rails 23 and 24, respectively, mounted upon the longitudinal beams 14 and 15 respectively. The wheels are rotatably mounted upon the carriage which includes cross members 26 upon which are mounted a plurality of knees 27 capable of movement transversely to the longitudinal axis of the carriage. The knees comprise work-engaging means adapted to abut against the rear surface of a workpiece such as a log 28, supported upon the carriage and movable thereby longitudinally with respect to a working tool such as a saw, indicated at 29. The work-engaging means may also comprise a dog 31, or a plurality thereof, adapted to be operated by a lever 32 to hold the log against the faces of the knees. The knees are connected for simultaneous transverse movement by means including a shaft 33 extending between the cross members 26. Up to this point a sawmill is so conventional that further details of the apparatus are believed unnecessary for a complete understanding of the invention. Details of means for interconnecting a driving motor or other motive means with the knees are illustrated in my above mentioned patent, as well as an operative circuit for controlling the motor which moves the knees.

The improvement comprising my present invention comprises the control tower, generally indicated at 40, which includes a standard 41 and a dial housing 42. Within the standard 41 there is preferably mounted a sprocket chain 43 extending about a sprocket gear 44 on the shaft 33 and a sprocket gear 45 mounted within the dial housing 42. The chain is schematically illustrated herein and its mounting may comprise tensioning members and the like such as are illustrated in my above mentioned patent. It is sufficient for the purpose of the present invention to state that the knees 27, comprising work-engaging surfaces, are interconnected with the sprocket 45 for simultaneous movement, the sprocket 45 being rotated an angular distance corresponding to the linear distance transversely of the carriage of the faces of the knees from adjacent face of the saw.

The housing 42 comprises a cylindrical drum having openings therethrough (not shown) through which the chain 43 may pass, a rear wall 48 and a translucent face plate 49 which may be formed of glass of sufficient thickness to be very rigid and resistant to stresses. An intermediate plate 50 within the drum is provided with a forwardly projecting journal 51 within which is preferably mounted a spaced pair of ball bearing assemblies 52 and 53. Journaled for rotation within the ball bearing assemblies is a hollow spindle 55 which at its inner end is fastened to the sprocket gear 45 by means of a flanged member 56 and screws 57, the flanged member being fastened to the spindle 55 through the medium of a plurality of set screws 58 provided for the purpose of obtaining concentricity. The forward end of spindle 55 is provided with an annular shoulder 61 thrusting against the bearing assembly 53, and endwise play of the spindle is prevented by the flanged member 56 which thrusts against the bearing assembly 52. The annular flange 61 is welded or otherwise suitably secured to a disc 62 which carries at its outer periphery an annular indicator dial 63 which may be fastened thereto by means of screws (not shown) or by other suitable securing means. The outer periphery of the annular dial 63 carries a rim 64 provided for stiffening purposes.

Concentrically mounted for rotation within the spindle 55 is a shaft 70 which extends beyond each end of the spindle and is supported therein by suitable means, such as bronze bushings 71 and 72. The inner end of the shaft 70 passes through a thrust-bearing assembly 73 adapted to bear against the inner end of the spindle 55 and to provide a non-rotative seat for one end of a spring 74, compressed thereagainst by the hub 75 of an arm 76 fixed to the shaft 70 for rotation therewith. The end of the shaft is preferably square in cross section and a similarly configured opening is provided in the hub 75. Retaining means such as the locking ring 77 and lock bolt 78 of any suitable nature may be provided.

The forward end of the shaft 70 is enlarged to provide a shoulder 80, and an annular member 81 may be welded thereto to provide an enlargement of the shoulder. A disc-like control dial 82 is fastened to the member 81 by screws (not shown) or other suitable means. A friction disc 83 is mounted between the juxtaposed surfaces of the member 62 and the disc 82 and may be adhered to one or the other of those members, whereby the compression of the spring 74 normally causes clutching engagement of the control dial with the indicator dial.

The translucent face plate 49 is mounted at the forward end of the drum 42, preferably seating against a flange 85 welded to the inner surface of the drum and having a forward facing 86 of felt or other suitable cushioning material. The opposite face of the periphery of the face plate is engaged by the overhanging lip 87 of a ring 88 set into a recess 89 in the outer surface of the drum and retained thereon by a plurality of bolts 90 threaded into threaded openings in the flange member 85. The face plate is provided with a central opening 95 of sufficient diameter freely to admit passage therethrough of the forward end of the shaft 70 and a centrally apertured disc 96 is slipped over the end of the shaft and may be adhered to the face plate 49 or freely slip with respect thereto. The extreme outer end of the shaft is encircled by an annular fulcrum ring 97 which is keyed thereto by a key 98 so that rotation of the shaft causes rotation of the ring 97. The end of the shaft is slotted to provide ears 100 between which is pivotally mounted a clutch lever 101 by means of a pivot pin 102 which may be locked in position by a cotter pin (not shown) or other suitable means. The inner end of the control lever 101 rests upon and retains the key 98 in position. Near its inner end and a short distance from the axis of pivot member 102 the lever is provided with a thrust point, preferably comprising a set screw 103 which may be locked in adjusted position by a set screw 104, the inner end of screw 103 being so located as to bear against the outer face of the fulcrum ring 97. The surface of the bottom of the slot between ears 100 slopes toward the fulcrum point, as indicated at 105, so that shifting movement of the lever 101 toward the control dials may allow outward movement of the shaft 70 to the extent permitted by the undercut portion. Such outward movement of the shaft is in an unclutching direction, a very slight movement being sufficient to relieve pressure from the friction disc 83 to permit relative rotation of the dials 63 and 82. The outer end of the lever 101 is bent forward to provide a forwardly projecting portion upon which is rotatively fixed an operating handle 110 by means of which the lever and all parts attached thereto may be rotated when the handle is pressed toward the drum. The surface of the lever 101 adjacent the ring 88 is preferably provided with a lug 111 adapted to engage in any one of a series of notches 112 provided in the outwardly extending periphery of the ring 88. Each of the notches preferably comprises a less precipitous wall 113 than the opposed wall 114, the walls 113 being those walls on the sides of the notches in counterclockwise direction toward an index pointer 115, which is preferably located at the top of the control drum. The index pointer may comprise a pointed member passing through an opening 116 in the wall of the drum 42 and having a loop 117 at its outer end adapted to be retained in position by a screw 118.

When the control lever is shifted inwardly a slight amount the control dial is free to rotate with the control lever and the operator may thereupon rotate the control dial an angular amount as desired throughout an arc of 360°. Such rotation of the control lever will cause indicia 120 upon the face of the control dial to move past the tip of the pointer 115. By rotating the clutch lever in a clockwise direction, the indicia will be rotated past the index pointer in ascending order. As soon as the operator observes the desired numeral approaching the tip of the index pointer 115 he may give an extra push against the knob 110 sufficient to urge the lug 111 into engagement with the rim of the ring 88 or the sides of a notch 112. As soon as the lug engages the steep side 114 of the notch 112 the lever will be halted, thus arresting the control dial at the preselected position. When the operator releases knob 110 the lever will spring outwardly to clutch-engaging position and the control dial 82 will be clutched to the indicator dial 63.

The arm 76 mounted upon shaft 70 is provided at its free end with a shoe 125 of such shape as to engage a roller 126, carried by a downwardly projecting arm 127 of a switch-operating shaft 128 extending from a switch box 129. Such engagement will occur as the control lever 101 and the switch actuating arm 76 approach the index point in alignment with the index pointer 115, and the parts are so correlated that switch opening action will occur when the lever is exactly opposite the index point. Details of such a switch mechanism and the adjustments thereof are so common in the arts that complete illustration thereof is thought to be unnecessary.

It is to be noted that in the preferred embodiment herein illustrated the control dial 82 is provided with indicia 120 representing one inch numerals, from 0 to 24 inches, and intermediate graduation marks at the thirds of each inch. These numerals are preferably applied to the dial in a counterclockwise direction of ascending order. The indicator dial face is also provided with a plurality of indicia representing inch marks, there being an inner row of numerals from 0 to 23, followed by an intermediate row from 24 to 47, and an outer row from 48 to 71. The inner edge of the dial may likewise be provided with marks indicating fractions of an inch. The face of the dial may likewise be provided with row-separating lines 136 guiding the operator's eye from one row of numerals to the next as seen in Figures 2 and 5. These numerals are also preferably applied in ascending order counterclockwise of the dial.

The ring 88 is preferably provided with a plurality of elongated slots 140 through which pass the bolts 90 retaining the ring in adjusted position. The ring is preferably provided with an index mark 141 and the surface of the drum 42 adjacent thereto is preferably provided with a plurality of marks representing fractional parts of an inch. By loosening the bolts 90 the ring may be adjusted circumferentially of the drum to an extent determined by the operator, whereupon it may be again fixed in adjusted position. The ring thus provides a plurality of abutment points at predetermined angular relation to the index point, all of which abutments may be offset simultaneously a desired amount.

Reference to Fig. 1 will disclose a push-switch knob 150, which is designated as a forward control, and a push-switch knob 151 which is designated as a rearward control. Reference to my prior patent above mentioned will make clear the operation of a control circuit controllable by similar forward and rearward push buttons for causing the knees of a sawmill carriage to approach or recede from a saw. When the knees are at their foremost position they will just clear the surface of the saw upon feeding movement of the carriage past the saw. When the knees are in their rearmost position there is room upon the carriage for a log of the maximum diameter which may be sawed in the particular mill. Since the knees and the indicator dial 63 are interconnected for simultaneous movement the numeral zero on the indicator dial will be opposite the pointer 115 when the knees are forward, and this numeral will also underlie the pointer if the knees are arrested at a point two feet, four feet or six feet from their forward position.

The operation of my invention is as follows:

The operator holds lever 101 in unclutching position and rotated clockwise to disengage shoe 125 from roller 126 and presses the rearward control button 151 to cause the knees to recede from the edge of the carriage. He may stop the knees at any suitable point sufficient to permit the reception of a log upon the carriage by bringing lever 101 to the vertical, whereupon the button 150 may be pressed to cause the knees to engage the log. The dog 31 may thereupon be set to retain the log in engagement with the knees and the knees are then moved forward so that sufficient of the log will extend beyond the saw for the first slab cut. The indicator dial will disclose the amount of log remaining after the slab cut has taken place and the operator will always be apprised of the remaining log width by glancing at the indicator dial. For example, in Fig. 5 the indicator dial shows that a log, 27 or 51 inches in width, is mounted upon the carriage. While the saw is making the first cut the operator may press inwardly to a slight extent upon the knob 110 and rotate the control dial to an extent sufficient to insure that the next cut will take place at such a distance as to provide a slab of desired thickness, in Fig 5 the control dial having been rotated to control the creation of a two inch slab. Further inward movement of the knob 110 while rotating the lever as it approaches the second abutment 112 from the index point will cause arrest of the control dial at the exact point desired. Fig. 5 discloses the abutment ring as having been shifted clockwise an angular distance representing one-third of an inch, which is the setting desired by the operator as made necessary by a saw thickness of one-third of an inch. This means that upon return of the carriage to position for the next longitudinal cutting movement the operator may press the forward button 150 to feed the log forward two and one-third inches, in other words, an amount sufficient to create a two inch slab when cut by a saw having a one-third inch kerf. The control dial and indicator dial now rotate counterclockwise as a unit and when the arm 76 reaches an upright position it will cause opening of the switch 129 to arrest the knees at exactly the preselected point. The indicator dial will now disclose to the operator that either 25 or 49 more inches of log are available to him to aid him in selecting the next slab width.

Having illustrated and described a preferred embodiment which my invention may assume, it will be readily apparent to those skilled in the art that the same permits of modification in detail and arrangement. I claim as my invention all such modifications as come within the true spirit and scope of the appended claims.

I claim:

1. A setworks for a sawmill carriage or the like comprising a rotatable control dial having indicia thereon for indicating the extent of transverse movement of a workpiece such as a log with respect to a working tool such as a saw, a shaft supporting said dial a control lever mounted on said shaft and extending substantially normal thereto for shifting said control dial angularly with respect to an index position, a pivot extending transversely of said shaft and supporting said lever for pivotal movement toward the plane of said control dial, and a plurality of abutments surrounding said dial and readily engageable by said lever when moved toward said dial to facilitate arrest of said control dial at a desired angular position.

2. A setworks for a sawmill carriage or the like comprising a rotatable control dial having indicia thereon for indicating the extent of transverse movement of a workpiece such as a log with respect to a working tool such as a saw, a shaft supporting said dial, a control lever extending normally to an end of said shaft for moving said control dial angularly with respect to an index point, a pivot extending transversely of said shaft and supporting said lever for pivotal movement to the plane of said control dial, and a plurality of abutments surrounding said dial at selected angular distances from said index point, said abutments being readily engageable by said lever to facilitate arrest of said control dial at a desired angular position and comprising a plurality of notches having less precipitous sides toward said index point than the sides away from said index point in the clockwise direction.

3. A setworks for a sawmill carriage or the like comprising a main indicator dial having indicia thereon adapted to indicate the total thickness of a log mounted on the sawmill carriage, a control dial releaseably clutched to said main dial and having indicia thereon adapted to indicate the extent of desired transverse movement of the log with respect to a working tool such as a saw, means to unclutch said dials from each other and to rotate said control dial with respect to said indicator dial a predetermined angular distance representing the desired thickness of board to be cut on the next travel of the carriage comprising a lever mounted coaxially with said control dial and pivotally movable from a normal position parallel to the face of said control dial to a clutch disengaging position inclined toward said control dial, an arm rotatable with said control dial at all times, means actuated upon transverse movement of the log to rotate said main dial and thereby cause rotation of said control dial when clutched to said main dial, means actuated by said arm for arresting said dials after rotation to the extent predetermined by the setting of said control dial, and means for facilitating the setting of said control dial at any of a plurality of selected positions comprising a plurality of spaced notches concentrically surrounding the periphery of said control dial at a radial distance less than the length of said lever and into which said lever may move.

4. A setworks for a sawmill carriage or the like comprising a main, annular indicator dial having indicia thereon adapted to indicate the total thickness of a log mounted on the sawmill carriage, a concentric, inner, control dial releaseably clutched to said main dial and having indicia thereon adapted to indicate the extent of desired transverse movement of the log with respect to a working tool such as a saw, means to unclutch said dials from each other and to rotate said control dial with respect to said indicator dial a predetermined angular distance representing the desired thickness of board to be cut on the next travel of the carriage comprising a lever mounted coaxially with said control dial and pivotally movable from a normal position parallel to the face of said control dial to a clutch disengaging position inclined toward said control dial, an arm rotatable with said control dial at all times, means actuated upon transverse movement of the log to rotate said main dial and thereby cause rotation of said control dial when clutched to said main dial, and means actuated by said arm for arresting said dial after rotation to the extent predetermined by the setting of said control dial comprising a plurality of spaced notches concentrically surrounding the outer edge of said main dial at a radial distance less than the length of said lever and into which said lever may move.

5. In a setworks for a sawmill carriage having work-engaging knees movable transversely of the carriage for feeding a log toward the saw in successive increments of movement as may be variably determined by the operator between saw cuts, an indicator dial, a control dial coaxial therewith, clutch means including a spring normally holding said clutch means in clutching engagement whereby said dials rotate coextensively, means to release said clutch means comprising a lever, said lever and said control dial being interconnected for simultaneous rotation with respect to an index point, and a ring encircling said dials coaxially thereof and having a plurality of spaced notches therein engageable by said lever when in clutch-releasing position, each of said notches having a less precipitous side toward said index point than its side away from the index point in a clockwise direction to facilitate instantaneous arrest of said lever at a preselected notch when rotated clockwise in the direction of control setting movement.

6. In a sawmill having a saw, a carriage movable past said saw for feeding a log lengthwise to be cut into slabs, knees on said carriage engageable with the log, and means for moving said knees transversely of said carriage between successive cuts of the saw; a setworks comprising an annular indicator dial, means interconnecting said indicator dial and said knees to indicate the thickness of log remaining upon said carriage, a control dial mounted coaxially within said indicator dial in the same plane therewith, releaseable clutch means engaging said dials for simultaneous rotation upon movement of said knees, a clutch lever movable to clutch-releasing position to disengage said dials, said lever being fixed to said control dial for rotation therewith and shiftable in a direction normal to the plane of said dials for disengaging movement, a spindle carrying said indicator dial, a shaft mounted coaxially within said spindle and carrying said control dial, a translucent face plate in front of said dials through which said shaft extends, spring means urging said shaft in one direction for clutching engagement of said dials, means pivotally fastening said lever to said shaft, and fulcrum means mounted upon said face plate and engageable by said lever upon movement in a plane normal to the plane of said dials for shifting said shaft axially to compress said spring means and release said dials.

7. In a sawmill having a saw, a carriage movable past said saw for feeding a log lengthwise to be cut into parallel-sided sections, knees on said carriage engageable with the log, and means for moving said knees transversely of said carriage between successive cuts of the saw; a setworks comprising an annular indicator dial, means interconnecting said indicator dial and said knees to indicate the thickness of log remaining upon said carriage, a control dial mounted coaxially within said indicator dial in the same plane therewith, a friction disc normally coupling said dials for simultaneous rotation upon movement of said knees, a lever fixed to said control dial for rotation therewith, said lever being shiftable in a direction normal to the plane of said dials, a spindle carrying said indicator dial, a shaft mounted coaxially within said spindle and carrying said control dial, means pivotally fastening said lever to said shaft, spring means urging said shaft in one direction for clutching engagement of said dials by said friction disc, and a fulcrum member engageable by said lever upon movement in a plane normal to the plane of said dials to shift said shaft axially for compressing said spring means and releasing said dials.

LESTER J. PETERS.

REFERENCES CITED

The following references are of record in the file of this patent:

UNITED STATES PATENTS

| Number | Name | Date |
|---|---|---|
| 793,406 | Trout | June 27, 1905 |
| 949,068 | Garland | Feb. 15, 1910 |
| 995,205 | Trout | June 13, 1911 |
| 1,004,837 | Wright | Oct. 3, 1911 |
| 1,505,005 | Dorman | Aug. 12, 1924 |
| 1,521,776 | Loken | Jan. 6, 1925 |
| 1,532,949 | Reid | Apr. 7, 1925 |
| 1,716,396 | Turner et al. | June 11, 1929 |
| 1,786,776 | Pelton | Dec. 30, 1930 |
| 2,342,967 | Peters | Feb. 29, 1944 |